US009247277B2

(12) United States Patent
Watson et al.

(10) Patent No.: US 9,247,277 B2
(45) Date of Patent: Jan. 26, 2016

(54) SYSTEM FOR THE DELIVERY AND DYNAMIC PRESENTATION OF LARGE MEDIA ASSETS OVER BANDWIDTH CONSTRAINED NETWORKS

(71) Applicant: Disney Enterprises, Inc., Burbank, CA (US)

(72) Inventors: Scott F. Watson, Marina Del Rey, CA (US); Eric C. Haseltine, Burbank, CA (US); Eric Freeman, Bainbridge, WA (US); Elisabeth Robson, Bainbridge Island, WA (US); Aaron P. LaBerge, Burlington, CT (US); Adam T. Fritz, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/560,279

(22) Filed: Dec. 4, 2014

(65) Prior Publication Data

US 2015/0095958 A1 Apr. 2, 2015

Related U.S. Application Data

(63) Continuation of application No. 13/857,095, filed on Apr. 4, 2013, now Pat. No. 8,949,916, which is a continuation of application No. 13/585,600, filed on Aug. 14, 2012, now Pat. No. 8,458,755, which is a continuation of application No. 10/632,003, filed on Jul. 30, 2003, now Pat. No. 8,272,020.

(60) Provisional application No. 60/403,995, filed on Aug. 17, 2002, provisional application No. 60/405,157, filed on Aug. 21, 2002.

(51) Int. Cl.
*H04N 7/173* (2011.01)
*H04N 21/262* (2011.01)
*H04L 29/06* (2006.01)
*H04N 7/167* (2011.01)
*H04N 21/4147* (2011.01)
*H04N 21/4335* (2011.01)
*H04N 21/4627* (2011.01)
*H04N 21/433* (2011.01)
*H04L 29/08* (2006.01)

(52) U.S. Cl.
CPC .... *H04N 21/26216* (2013.01); *H04L 29/06027* (2013.01); *H04L 65/4084* (2013.01); *H04L 65/60* (2013.01); *H04L 65/604* (2013.01); *H04L 65/80* (2013.01); *H04L 67/327* (2013.01); *H04N 7/1675* (2013.01); *H04N 21/4147* (2013.01); *H04N 21/4331* (2013.01); *H04N 21/4335* (2013.01); *H04N 21/4627* (2013.01); *H04L 67/322* (2013.01); *H04L 67/42* (2013.01); *H04L 69/24* (2013.01); *H04L 69/329* (2013.01)

(58) Field of Classification Search
CPC .............. H04N 21/26216; H04N 21/4147; H04N 21/4335; H04N 21/4627; H04N 21/4331; H04N 69/24; H04N 69/329; H04N 7/1675; H04L 65/60; H04L 65/4084; H04L 65/604; H04L 65/80; H04L 67/42; H04L 67/322; H04L 67/327; H04L 29/06027
See application file for complete search history.

(56) References Cited

U.S. PATENT DOCUMENTS 6,701,528 B1 * 3/2004 Arsenault et al. ............... 725/89
2003/0126595 A1 * 7/2003 Sie et al. ......................... 725/29

* cited by examiner

*Primary Examiner* — Oschta Montoya
(74) *Attorney, Agent, or Firm* — Farjami & Farjami LLP

(57) ABSTRACT

Media content, based on a predetermined set of constraints, from a content provider is delivered to a local cache of a user device before viewing the media. A client asset manager process resides in the user device, an asset list at the content provider site, and the media assets are located at a remote site.

6 Claims, 4 Drawing Sheets

```
<|ELEMENT channel (item+ | refreshRate | helpUrl? | cookieDomain? |
cookieName?)>
<|ELEMENT item (link | expires | hitCountUrl? | throughput? | trackWithCookie?
)*>
```

The following is an example XML group file:

```
<|?xml version="1.0" ?>
    <channel>
        <item>
            <link>http://myserver/myfile.wmv</link>
            <expires>2002-22-03T00:17:15z</expires>
            <hitCountUrl>http://hitserver/hiturl</hitCountUrl>
            <throughput>75</throughput>
            <trackWithCookie/>
        </item>
        <refreshRate>60</refreshRate>
        <helpUrl>http://myserver/help.html</helpURL>
        <cookieName>adAssets</cookieName>
        <cookieDomain>.go.com</cookieDomain>
    </channel>
```

FIG. 3

| Internal Class Name | COM/ActiveX Class Name |
|---|---|
| CCacheAsset | CDisCacheAsset |
| CCacheGroup | CDisCacheGroup |
| CCacheReference | CCisCacheReference |

FIG. 4

| Error Type | Retry Attempted | Timeout Before Retry |
|---|---|---|
| Invalid item URL | no | N/A |
| Server Connection | yes | 5 minutes |
| Server not found | yes | 5 minutes |
| File not on server | yes | 15 minutes |
| Unknown server error | yes | 15 minutes |
| Internal Error | yes | 1 hour |

FIG. 5

| Error Type | Retry Attempted | Timeout Before Retry |
|---|---|---|
| Invalid item URL | no | N/A |
| Server Connection | yes | 5 minutes |
| Server not found | yes | 1 hour |
| File not on server | yes | 1 hour |
| Unknown server error | yes | 15 minutes |
| Internal Error | yes | 1 hour |

FIG. 6

*Asset List*

Asset 1: {Attribute(1,1); Attribute (1,2);...;Attribute (1,M)}
Asset 2: {Attribute(2,1); Attribute (2,2);...;Attribute (2,M)}
⋮
Asset N: {Attribute(N,1); Attribute (N,2);...;Attribute (N,M)}

*FIG. 7*

*Asset List {Attribute 1; Attribute 2;...;Attribue N}*

Asset 1
Asset 2
⋮
Asset N

*FIG. 8*

SYSTEM FOR THE DELIVERY AND DYNAMIC PRESENTATION OF LARGE MEDIA ASSETS OVER BANDWIDTH CONSTRAINED NETWORKS

CROSS-REFERENCE TO RELATED APPLICATIONS

This application is a continuation of U.S. patent application Ser. No. 13/857,095, filed Apr. 4, 2013, which is a continuation of U.S. patent application Ser. No. 13/585,600, filed Aug. 14, 2012, now U.S. Pat. No. 8,458,755, which is a continuation of U.S. patent application Ser. No. 10/632,003, filed Jul. 30, 2003, now U.S. Pat. No. 8,272,020, which claims priority to U.S. Provisional Application Nos. 60/405,157 (filed Aug. 21, 2002) and 60/403,995 (filed Aug. 17, 2002), the contents of which are incorporated herein by reference in their entirety.

BACKGROUND

1. Field of the Invention

The present invention relates to delivering and presenting high quality, media based content, to users or processes over networks, with assured Quality of Service (QOS) even if insufficient network bandwidth is available.

2. Description of the Background Art

The inventors have recognized that even with advances in network technologies, delivering rich, high quality experiences will remain a challenge. In particular, delivering large media assets—whether they be audio, video, flash, games, data or other digital media formats—often requires more network bandwidth/throughput than is available. For instance, in the case of audio and video, a high bit rate asset can only be delivered in real time if a user's effective bandwidth is at least equal to the asset's bit rate, otherwise the result is a sub-optimal user experience complete with stutters, stops, and content buffering.

On the other hand, a large game executable may not have the same real time constraints (or required quality of service) as a video, however downloading the asset requires a significant amount of time and overhead for the user, even on the fastest networks. While a number of "download managers" on the market will take care of this for the user, a content provider may wish to intelligently and adaptively manage the download of assets to the user device (e.g., a computer, a set-top box with memory and/or processor, a device) in an elegant and transparent manner, without needing the attention of the user.

Given this, there is a need to manage and deliver large, high quality media assets to users using their limited bandwidth in a time shifted manner. That is, there is a need to be able to unobtrusively deliver content to users via available bandwidth and idle cycles, so that when the high quality content is needed, it is readily available on demand and an uncompromised user experience is rendered. This in turn provides the illusion that the user has more effective bandwidth than is actually available. To this end there is also a need for this technology to integrate seamlessly into delivery and presentation platforms (including but not limited to web browsers, flash and other platforms) and content publishing systems. The present invention achieves this and other functionalities and also overcomes the limitations of the prior art.

For ease of understanding, the following definitions will apply throughout this application; however, no definition should be regarded as being superceding any art-accepted understanding of the listed terms.

Glossary:

1. Throughput—The amount of data transferred from one place to another in a specified amount of time. Typically, throughputs are measured in kbps, Mbps and Gbps.

2. Quality of Service, QOS—The term that specifies a guaranteed throughput level.

3. Client Process—The process on the client that receives cache/display management directives or hints from a server process and then executes directives to bring the cache current state in line with desired state and may trigger one or more notifications to users or other process's as it does so.

4. Cache—A store of assets with "known" availability or QOS. A cache in this context is an asset storage mechanism where the QOS meets the content requirements and is in general higher than the medium used to acquire the assets. State changes within the cache may result in notifications.

5. Server Process—Provides the client with the information required for the client to manage the state of the cache. In its most simple implementation it is similar to a quasi dynamic server generated play list. More elaborate implementations (all of ours) also provide control directives for the client to inform other process's of progress against specific sets of assets.

6. Expiration date—expiration date of asset, and indicates when the asset should be removed from the local cache.

7. Callback URL—a URL that is retrieved once the asset item has been downloaded.

8. Client-side Token—a token or cookie to set when the item has been downloaded. This allows a client or server application to determine the presence of an asset on the local system.

9. Embargo Date—This indicates the latest date the asset will be used.

10. Delete—This indicates that the asset is to be marked for explicit deletion (to override the expiration date). This allows for retraction of an asset.

11. Refresh rate—determines how often a client checks an asset list for changes.

12. Resource path—the network location of any number of resources associated with the asset list.

13. Media Assets—at least one of a text, audio, video, or binary file/data.

14. Item—a single media file.

15. Link—URL for the media file.

16. hitCountUrl—URL to ping after the file has successfully downloaded. A parameter, duration, will be appended to the end of the URL indicating, in seconds, how long the download took.

17. helpUrl—URL for the client process help that is to be displayed when the user selects help menu item.

18. trackWithCookie—optional element that, If present, indicates this asset will be added to the list of assets in the cookie specified by cookieName.

19. cookieName—name of the cookie that lists all downloaded assets that have the trackWithCookie element present. This cookie is essential for ad serving so the ad server knows which ads have been downloaded. The format of the cookie will consist of the name only of the files (no extension or path) separated by commas.

20. cookieDomain—domain on which to set the downloaded assets cookie, Multiple domains can be specified if separated by semi-colons or commas.

21. /regserver—registers the ActiveX controls with the system and adds the client process to the startup folder.

22. /shutdown—stops another running instance of the client process, if present.

23. /unregserver—unregisters the ActiveX controls and removes the shortcut from the startup folder. Also stops the running instance of clientprocess.exe and removes COM object registry entries.

24. CDN—Content Distribution Network. A federated group of content servers owned and operated by a $3^{rd}$ party. In general practice a CON service provide additional capacity using a highly decentralized collection of servers.

SUMMARY OF THE INVENTION

The present invention provides for a system and method by which media content is delivered from a content provider to a local cache of a user device, based on a predetermined set of constraints, prior to viewing the media. An asset list comprises information related to the media assets to be downloaded to the client device, and is transmitted from the content provider to the user device. The asset list, for example contains URL's or information related to the location of the media assets.

A client asset manager process resides in the user device and is responsible for downloading assets from the content provider. The asset manager uses the asset list to request media assets which are located at a remote site. The client process manages delivery of assets to the user device, periodically, when specific constraints are met. For example, assets are delivered to the user when there is optimal network bandwidth availability, user device memory, assured quality of service, etc.

The present invention thereby provides a continuous, uninterrupted, and substantially seamless display (visual and auditory) of media content by efficient delivery of the media assets to the users. By integrating these assets with a viewing means (e.g., a web-browser), the user is provided an uninterrupted and continuous stream of media content that does not require real-time buffering.

The present invention furthermore provides improved methods for delivering one or more large media assets, for instance, audio content, video content, movies, games etc., intelligently and adaptively, over a network to a local asset store. As such, the local asset store is available to a client, or end-user, device and where a relatively high quality of service is to be assured. The invention also includes an adaptive method of combining these assets into an essentially seamless presentation based on local availability of the assets.

The present invention comprises a method for delivering an asset over a network. The method comprises supplying an asset list over the network to a user device. The method further comprises a client which operates on a user device. The client refers to the asset list in downloading and delivering the asset to the user device.

The client further manages downloading the assets based on when at least one predetermined constraint is satisfied.

A content provider can place a digital asset on a user's device a priori, so that it is immediately available for use, without a network download, when the user needs it. This can happen when explicitly requested by a user or process, or be initiated by a content provider based on a subscription service.

The invention is further described with reference to the accompanying drawings.

BRIEF DESCRIPTION OF THE DRAWINGS

FIG. 3 shows an exemplary program code for the file;

FIG. 4 is an exemplary depiction of C++ classes in the client process application;

FIG. 5 is an exemplary depiction of a timing feature used for downloading media assets by the client;

FIG. 6 is an error chart which affects the amount of time to wait for a media asset download;

FIG. 7 depicts one aspect of the hierarchical nature of the attributes in relation to asset information in an asset list; and FIG. 8 depicts another aspect of the hierarchical nature of the attributes in relation to asset information in an asset list.

DESCRIPTION OF THE PREFERRED EMBODIMENTS

A. General Description

Figure 1:
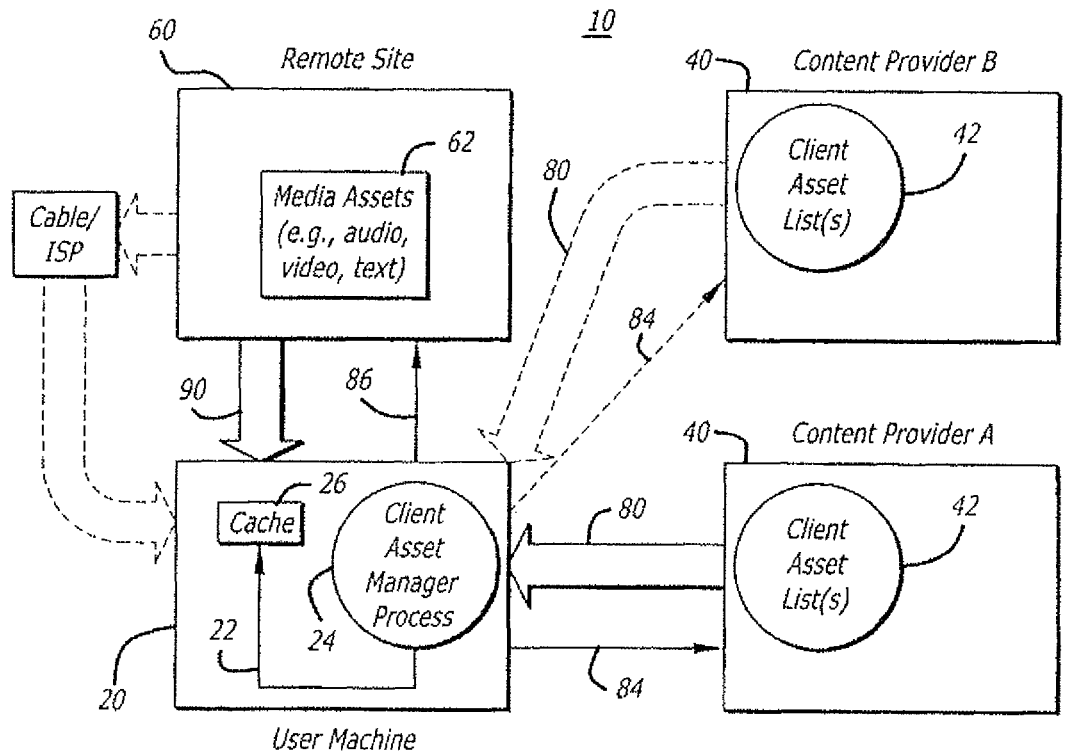
FIG. 1 shows a general overview of the client process, according to one embodiment of the present invention, interacting with a content provider site and a remote media server.

A continuous, uninterrupted, and substantially seamless display (visual and auditory) of media content, by efficient delivery of the media assets is provided to users. Specifically, assets are delivered to a user device, periodically, when specific constraints are met (e.g., network bandwidth availability, user device memory, assured QOS, etc.) By integrating these assets with a viewing means (e.g., a web-browser), the user is provided an uninterrupted and continuous stream of media content that does not require real-time buffering.

One or more large media assets, for instance, audio content, video content, movies, games etc., are delivered intelligently and adaptively, over a network to a local asset store. As such, the local asset store is available to a client, or end-user, device and where a relatively high QOS is to be assured. There is also an adaptive method of combining these assets into an essentially seamless presentation based on local availability of the assets.

One example of a local asset store, where the QOS is assured, could be a cache or a data storage facility offered by Local Area Network (LAN) to which the user device is connected. By local availability it is meant that an asset is available on a local to end user or process storage system (or a local store, with a high speed network in between the client device and the local store).

In one embodiment a process or application runs on a user's device, herein referred to as the client. The client is responsible for managing a cache of content on the user's local store. Applications, web pages and multimedia presentations can then rely on this cache to incorporate large media assets that are already resident. Applications, web pages and multimedia presentations can query the cache about its content and dynamically tailor user experiences around the content that is available. These applications may be client or server side applications.

The client may be a service that is downloaded from the Internet and installed in the user's device. The client may alternatively be provided as a core component of a computer operating system, or come bundled with other software applications.

The client manages a cache of media assets for the end user. In one implementation, the assets included in the cache are dictated by an asset list provided by a content provider. In this implementation, the client retrieves the asset list at specific and tunable time intervals from a network location. Based on the information in the asset lists, the client manages the download of assets from a remote location when predetermined constraints are satisfied.

A client is allowed to be associated with more than one asset list, so that many service providers or multiple business units of one service provider can separately maintain their own asset lists and make use of the same client to manage the downloads. Also, the client may be made aware of the location of an asset list when the client is installed or updated. The install is initiated from a web page. If the client is not yet installed in the client device, software in the web page detects this and prompts the user to download and install the client. It is also possible to add an asset list to the client through scripting (combined with ActiveX controls) in a web page.

The client manages the download of assets based on predetermined constraints. As has been mentioned thus far, predetermined constraints include, for example, network bandwidth availability, user device memory, time of day, and assured quality of service. For instance, in one implementation of the client, downloads only occur when the user device is idle. In another implementation, the client process downloads only when network activity is below a certain level. In another instance, the client process measures the CPU and memory usage on the user device, and the predetermined constraint is met when usage is below certain performance levels. In yet another instance the client process manages the downloading of assets based on the time of day, and statistically when network usage is lowest. The client process can of course, additionally utilize any combination of constraints to manage the download of assets.

The download capability can be switched on and off by the user. The user can also specify that downloads only happen when the device is on certain networks (for example on a LAN versus a dialup connection). For example, a user may subscribe to a content service whereby assets are downloaded (by the client) in the late evening hours for morning viewing.

Furthermore, intelligent and adaptive management of assets is possible without the need for an explicit "download manager" under control by a user. By intelligently, it is meant that the assets are delivered to the client when some predetermined constraints are satisfied (e.g., bandwidth of the network, time of day, QOS, etc.). By adaptively, it is meant that the asset lists, at the content provider site or the user device site, are automatically updated based on user viewing preferences.

Asset lists are used as a means for content producers to publish and manage content on client's local store. Thus, this functionality allows content producers to publish media assets that will at some point later be integrated into the presentation of an Application, web page or flash-based presentation. In one instance the producers enter information about an asset including its location, dates of presentation and text & related information that may be associated with the asset into a backend publishing system. This information is then published and incorporated into the relevant asset lists. The publishing system may also (immediately or at a certain date and time in the future) publish a web page or presentation that incorporates the asset.

One method for delivering asset over a network includes: (i) supplying an asset list by a content provider over the network to a client, wherein the client process operates on a user device; and (ii) delivering the asset, corresponding to the asset list, over the network to the user device when predetermined constraints are satisfied. As an example, the asset could be at least one of a binary data, an audio content, a video content, a textual content, or a multimedia file. The predetermined constraints could include the time of day, the user device status (i.e., whether the device is being used or is idle), bandwidth usage (i.e., whether the bandwidth usage is below a predetermined operating level, the user device CPU usage, the user device memory usage (i.e., whether the memory usage is below predetermined operating levels). In addition, the asset could be stored in the local cache of the user device. Furthermore, the client may integrate the stored asset with the real time content, from the content provider, in a seamless fashion to provide an uninterrupted and seamless presentation of content to the user. Moreover, the asset list can be updated frequently, thereby providing the client process (or cache) with the ability to receive a wide variety of content periodically based on the predetermined constraints.

The system provides to a user an uninterrupted stream of content comprising: (i) an asset list made available by a content provider over the internet to a client process, wherein the client process operates on a device of the user; (ii) an asset, made available from a remote location, over the network to the user device when predetermined constraints are satisfied, wherein information of the remote location is obtained from the asset list; and (iii) an integrator tool for integrating the delivered asset with a content stream being received by the user device from the remote location over the internet. The user is presented with an uninterrupted and continuous stream of content.

The producer can enter alternative low-bandwidth media assets and corresponding textual information, which can then be combined in the backend with the information on the rich media assets to produce two different versions of the page (one for users that for whatever reason have not been able to download the large assets and one for the rich media assets). Users may not be able to download the rich media assets for a number of reasons, such as (1) incompatible system (2) their systems haven't been online to receive the downloads (3) they haven't paid for a premium service (4) they have insufficient disk space (5) they have been using the computer and didn't want it's resources used for downloading. As such, the ability to deliver an alternative experience in either case is important.

Content along with advertising can be delivered, for instance, in a sequenced fashion, only allowing the content to be played when a corresponding advertisement also exists in the local cache. In one embodiment this is achieved by using (client or server-side) scripting to determine if both media assets exist on the user's device (the content piece and the advertisement). In another embodiment, this functionality is achieved by using the asset list bundles, which sets a token when both assets are on the local device.

The user can actively specify the media that is downloaded and cached on the local device. In one implementation, this is achieved by a server-side database that manages an asset list for each user. For instance, in the middle of the week, a user might specify they'd like to watch a feature length DVD quality movie that weekend. This would result in an asset being added to their asset list and result in the client downloading the asset over time. The user may be charged to add the asset to this list, or (see below) digital rights management may be used to control the asset. In another instance, this method is combined with a "push" from the content provider as follows: to watch a late night news broadcast every morning a user subscribes to a service. As a result, the service inserts a new asset into the user's asset list each evening to identify the new show to be downloaded.

Furthermore, the system may work with ISP and cable provider co-location delivery facilities. In one implementation, when a producer publishes an asset it is then moved to an ISP and cable provider collocation delivery facility or system (which is close to the user in network geography). The client retrieves that asset and places it in local cache by retrieving it ISP and cable provider collection delivery facility or system rather than the service providers source media servers.

In addition, a content provider can optimize the user experience based on the assets at hand. For instance, a news related web site may provide a photo of a news story if no rich media asset is available, however if a video asset is stored locally, the web page may substitute the video in place of the image on the web page. This may include the corresponding textual "copy" of the video, as the video and image may not be of the same story and thus would require different supporting text and captions. In one embodiment this is accomplished by having the server-side application detect the presence of the asset via it's corresponding asset token (see asset lists attributes above). Depending on whether or not the token is present a different page is created for the end user. In another embodiment this is done on the client side via scripting in the web browser. That is, by using scripting in the web page a different page is created via dynamic HTML based on the existence of the media assets token.

One advantage provided by the invention is that it allows a content provider to optimize its network bandwidth usage. Specifically, by increasing delivery of content when usage falls below peak, the valleys of bandwidth use are filled such that bandwidth use is optimized.

In another aspect, digital rights management (DRM) schemes can be applied to the data flows. For instance, the DRM protected asset could be published through the invention. Thus, when the user "plays" the asset, they are prompted to acquire the appropriate license as a "right-to-use" the content.

In another aspect, GAME assets can be distributed in the form of real or virtual ISO images that may be used on the client.

B. Set-Top Box Example

The client may download and manage media assets related to media content from different sources such as a TV set-top box, wherein the assets are delivered on a sideband of a carrier signal or through a data network, such as a cable or satellite network or the Internet or an intranet. For example, in one embodiment, viewers at home have access to a library of movies, or any other audio/video content available for viewing at anytime. Specifically, the method involves transmitting media assets, such as movies, to a set-top box in one's home and allowing movies to accumulate.

A hard disk drive in the set-top box is used to store movies. The movies are transmitted using a datacasting technology which transmits large amounts of data over standard broadcast television signals. Information related to the datacasting technology is found in Application number WO9955087 to Hartson et al. filed on Apr. 16, 1999 and published Oct. 28, 1999, which is hereby incorporated by reference. For example, in a 24-hour period, this datacasting technology can distribute 20 high-quality feature-length movies. The set top box is easily connected to the user's television just as any other external device such as a VCR or DVD player. The set-top box is also connected to a phone line for billing purposes.

In an exemplary embodiment, the set top box is located in a person's home, connected to their television using standard video cables. The set top box has an antenna which receives data via the broadcast television signal. The set top box has, preferably, at least an 80 Gigabyte hard drive for storing a plurality of movies. The set-top box has a modem which the set-top uses to periodically contact the service provider. Information passed between the service provider and the set-top includes: the users "Viewing/Rental History" which is used for billing purposes, set-top performance logs which are used to monitor the performance of the system and "Movie Keys" which are used decrypt the movies.

The set-top box has a processor which is capable of receiving the data stream from the broadcast signal, reassembling data, and writing data to the hard drive. The processor must also be capable of simultaneously playing a movie and reacting to infrared signals from the remote control as well as modem activity. The hard drive is mated with the set-top box for security purposes, rendering it useless if removed and used anywhere else. The set-top box preferably does not have a fan as it is designed to be very quiet. The set top box also comprises a secure processor as part of its security system. The secure processor is the active component of a smart card which is physically attached to the PCB with epoxy to make it physically hard to tamper with.

Movies are not "streamed" to the set-top box in real-time, instead content files are "packetized" and these "packets" are continuously transmitted to the set-top box where they are incrementally reassembled. The user is not aware of what data is being sent to their set-top box. The movies are pushed down by the provider to reside passively in the box for a finite time period. Transmission of the data is controlled by the content or service provider. To ensure that movies are received in their entirety, the same movie may be broadcast to the set-top box several times. Any packets of data that were not received in the first attempt of transmission will be received with subsequent broadcasts. In the perspective of the present invention, a client process resides on the set-top box and the media assets (movie content) are retrieved from the remote site when predetermined constraints (e.g., network bandwidth, QOS) are satisfied.

Movies transmitted to the set-top box may also have associated information that defines certain characteristics of the movie. For example, a movie may have an associated start and end date or time which limits the time period in which a movie can be viewed. For example, a movie may arrive and be stored in the set-top box, however it may have a start date associated with it which does not allow it to be viewed until that date. This allows for any discrepancies in transmission times for movies that may vary from one location to another, and also allows for movies to be "pre-loaded" and immediately available on the official release date. Similarly, the asset list may have an end date associated with a movie, after which date the movie can no longer be viewed, and is automatically deleted from the set-top box.

Movies stored on the set top box are encrypted. Upon selection of a movie to view and satisfaction of business rules (i.e.: the user has sufficient credit), the set top box allows for the movie to be decrypted and played. The set-top box does not need to connect to the service provider prior to allowing a movie to be viewed, since the keys for decrypting the movies are typically pre-fetched and resident on the set-top along with the current account status. Obviously, the encrypted movies cannot be viewed without decrypting them. All decryption is logged and this log is used to determine a user's bill. The logic surrounding decryption and user account status is handled by the secure processor. In a preferred embodiment of the present invention, a fee is charged to the user upon selection of the movie for viewing, a subsequent "rental confirmation" dialog and prior to viewing of the movie.

In another embodiment, the user is billed for viewing a movie once a substantial portion of the movie has been viewed. Once a movie has been selected, it can be viewed again without charge for a limited period of time (e.g. 24 hours), or for a limited number of viewings. In another embodiment, instead of paying for each movie, the user is charged a monthly fee. The amount of the monthly fee will depend on various options such as the number of movies that can be viewed, the period of time that a selected movie is available for viewing, and the number of permitted viewings of each selected movie. A telephone line is used to effect transfer from the user of the information that a key is being sought by the user and thus a charge should be made. Thus, even though the user has a library of movies stored on the user's set-top box, there is no charge unless a movie is actually viewed.

In other embodiments, data can be transmitted to the set-top box by cable, satellite, internet, etc. Although wireless broadcast is a preferred embodiment, the present invention should not be limited to wireless transmission.

DESCRIPTION IN RELATION TO DRAWINGS

FIG. 1 shows a general overview of the system 10 used for delivering and presenting a media stream, without interruptions, on a user device. Specifically, the user device 20 includes an at least one client process 24 (e.g., a client asset manager process) that interacts with the client asset list 42 at a site of the content provider, depicted as 40. Also present, in the user device 20, is a local cache 26 for storing information. The cache 26 could be at least one of a random-access-memory (RAM), a read-only-memory (ROM), or a hard drive. In addition, there could be present a remote site 60 that contains assets 62 such as program content (e.g., a sporting event, cooking show, etc.). As an alternative, assets 62 could be located at the content provider site 40, or at a cable/internet-service provider (not shown). The asset is made available at the cable/ISP provider, before the client starts retrieving it. Furthermore, the client may retrieve the assets simultaneously from a plurality of physically separate locations (e.g., from a cable/ISP provider, content provider, etc.)

The client process 24 manages a cache of media assets 26 for the end user. In one implementation, the assets 62 included in this cache 26 are dictated by an asset list 42 provided by a content provider 40 via data path 80. In this implementation, the client asset manager process 24 retrieves the asset list 42 at specific (and tunable) time intervals from a network location (such as the content providers site 40) via data path 80. Specifically, the client process 24 places a request, via the control signal pathway 84, to the content provider 40 to deliver an updated asset list 42 via the data path 80.

Likewise, in another implementation, the asset list 42 could be sent to the end user client 24 by a server (not shown) of the content provider in a periodic manner. The asset list 42 is a data file that contains, at minimum, the list of content assets. Each element in the asset list 42 typically identifies a network location and protocol needed to obtain the asset. For example in one implementation this network location is a Universal Resource Locator (URL) and the protocol is HTTP. An asset list 42 may also contain other attributes (as explained in the summary section and defined in the Glossary section) associated with each asset, such as:

(i) Expiration date, (ii) Delete;

(ii) Callback URL—In one embodiment, this callback URL is used to initiate actions upon an asset's download, such as a tracking application (to allow tracking of which assets are downloaded and how often) and an application to notify the user via email or instant message that a particular asset is ready for viewing;

(iii) Client-side Token—In one embodiment this is used to adapt the presentation based on the availability of assets;

(iv) Throughput—In one embodiment this number is a percentage of available client throughput, and is less than 100%, the client can slow the download by attempting to get chunks of data only every so often rather than all at once. In another embodiment, this number is a download data rate in bytes per second;

Embargo Date—Any content may be subject to a limited window of availability. Once the embargo data has been reached the content is removed by the client so that it is longer available.

In one aspect, these assets can be combined into bundles of content. The above attributes can also be assigned to a bundle. For instance, this allows a client side token to be created once a set of media assets has been delivered to the user's device.

Certain attributes can be associated with the entire asset list 42, such attributes being:

(a) Refresh rate: In one implementation this could be controlled at the server side (e.g., at the content provider site 40), which would push the asset list 42 to a client manager 24 via data path 80.

(b) Resource Path, (c) Media Assets.

FIG. 7 depicts one aspect of the hierarchical nature of the attributes in relation to asset information in the asset list. As shown, the asset list that is provided to a client, by the content provider/ISP, has attributes for all asset information. As an example, Attribute(1,2) may refer to the expiration date of Asset 1. The attributes, in this depiction, are local to each asset.

In an alternative aspect, the attributes may be global to the asset list as shown in FIG. 8. In this situation, the client could manage the download of assets, in the asset list, based on the global attributes as applicable to all assets.

The client 24 is also capable of managing many parameters of its asset download behavior from a remote site 60. For example, in one implementation, the client asset manager 24 initiates a request to the remote site 60, via signal 86, to transfer media assets 62 to the local cache 26 via data path 90. The client process 24 can send these requests for data transfer (downloads) to the remote site 60 based on whether a set of predetermined constraints are satisfied. For example, downloads could occur when the user device 20 is idle, when the network bandwidth is below a certain level, when the CPU and/or memory usage in the user device 20 are below certain performance levels.

The download capability can be switched on and off by the user. The user can also specify that downloads only happen when the device is on certain networks (for example on a LAN versus a dialup connection).

The media assets 62 may be throttled or pushed by the remote site 60, depending on the network conditions (e.g., traffic, available bandwidth, time of day, etc.), without an initiating request from the client process 24.

The asset lists 42 are used as a means for content producers to publish and manage content on client's local store/cache 26. For instance, this functionality allows content producers to publish media assets 62 that will at some point be seamlessly integrated into the presentation of a web page or flash-based presentation (not shown).

Accordingly, the producers may enter information about an asset including its location, dates of presentation and text & related information that may be associated with the asset into a backend publishing system. This information is then published and incorporated into the relevant asset lists. The publishing system may also (immediately or at a certain date and time in the future) publish a web page or presentation that incorporates the asset. The producer enters alternative low-bandwidth media assets and corresponding textual information, which can then be combined with the information on the rich media assets to produce two different versions of the page (one for users that for whatever reason have not been able to download the large assets and one for the rich media assets).

The client asset manager process 24 an application that can run on the user device 20 to provide downloading and caching. Users would be able to opt-in, possibly through the content provider website, for obtaining the client manager/process. As an exemplary embodiment, the client manager could be installed to startup automatically and be running in the background.

Figure 2:
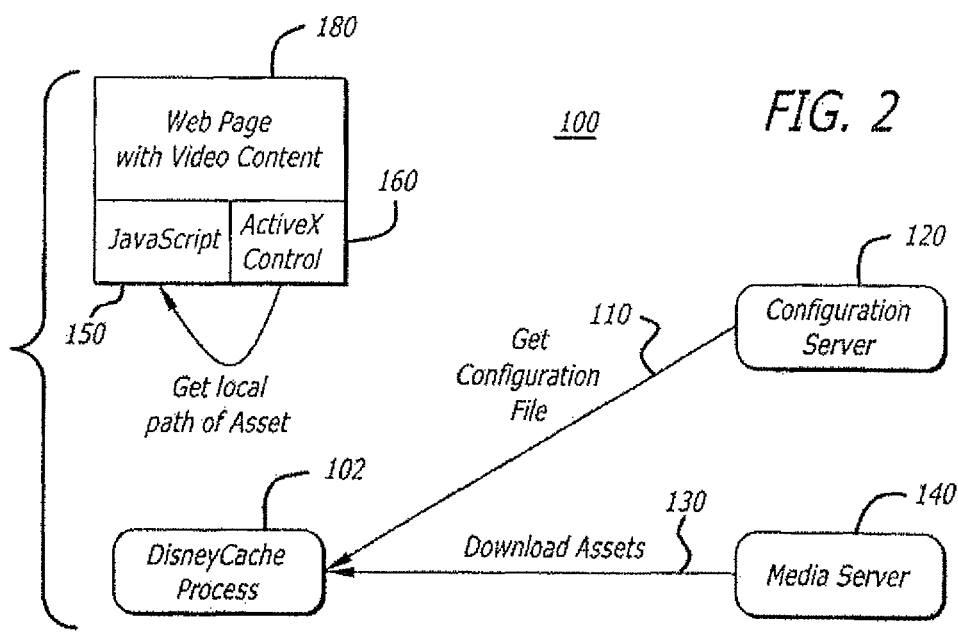
FIG. 2 is another view of the client process showing scripts used for integrating streaming and cached media into web browsers.

FIG. 2 displays another overview of the flow of information for the system 100 where the client asset manager process 102 is running on a user device. In an exemplary depiction, a client asset list 110 (e.g., an XML file) is periodically downloaded from a content provider 120, and assets 130 listed in that file are downloaded from the remote site/content provider 140 and cached accordingly. The user may navigate to a web page that can display a asset(s), by including a script 150 that communicates with the client manager process 160 Since the client manager process 102 could also be an ActiveX Server, only a proxy object could be running on the web page 180, and the actual control could be part of the client manager process 102. In an alternative aspect, the client process 160 could be embedded in the web page 180 or part of the client manager process 102.

C(i). Design Perspectives

The inputs may be: (i) configuration file such as an XML file that allows remote control over the behavior of client manager process 102; (ii) remote media files to be cached on the client. The outputs could be local paths to media files.

Any web page can display an asset that is cached by the client 102. Using the client's ActiveX interface, a page could contain JavaScript code 150 to see if the client process 102 is installed, and ask the client for information regarding the local path for a media file. If a path is returned, the script could then pass this path information to any web based media player that accepts parameters.

The configuration server 120 could be any web server that hosts the client configuration file 110. The media server 140 may be any web server that hosts the media files or assets 130, C(ii). Execution Flow The client process 102 may be packaged in a cab file and signed with a digital certificate to identify the creator of the program (e.g., the Walt Disney Internet Group). A separate .cab file, xyzvideo.cab, may be created for different content providers. For example, the filename could be espnvideo.cab for ESPN and it may be signed with the ESPN digital certificate. Internet Explorer uses the Internet Component Download feature to download and track the application. An .INF file could be included in the .cab to instruct the component down-loader as to how to install the client process 102.

The .cab file is placed on a web server and when the browser loads a web page with an OBJECT tag containing the class id of the appropriate ActiveX control, it will download the .cab file using the URL specified by the CODEBASE attribute. The digital certificate is displayed to notify the user that our control has been downloaded and prompts for permission to execute. Once the user accepts, this window will not be displayed again unless an updated version is downloaded.

The module, clientprocess.exe, is added to the Downloaded Program Files folder and the client may create a shortcut for itself in the Startup folder. The name of the shortcut is dependent upon who builds the file (e.g., Disney, ESPN, etc.). The client process 102 may also create a cookie on the go.com domain called ClientProcess which is set to true if the client process is installed. This cookie may be regularly checked to prevent it from being accidentally deleted by a user.

The program is initially executed by the operating system and from that point it will run whenever the user device is booted up.

The digital certificate, mentioned earlier, may be necessary since most users have their browser security settings high enough to disallow the installation of untrustworthy applications from the Internet. The presence of the certificate allows the browser to identify the origin of the software and ask the user whether that company or person should be trusted.

The CODEBASE attribute of the OBJECT tag supports the optional addition of the desired version of the software to be installed. The version is appended to the URL of the location of the cab, with a '#' used as the separator. If, for example, the current version of client process in the field is 1,0,0,1 and a new version 1,0,0,2 has been put on the web server, appending '#1,0,0,2' at the end of the CODEBASE URL will direct the component downloader to download and install the new version.

The .INF file contains a hook to first run clientprocess.exe with the /shutdown parameter to first close clientprocess.exe so the update will not require a reboot.

The component installer may add information to the registry using a predefined key, The menu for the client process system tray icon will contain an Uninstall option. When clicked, the client process will uninstall itself by running another instance of clientprocess.exe passing the /unregserver parameter. The uninstall process will do the following, (i) unregister the controls, (ii) cleanup the registry entries added by the client process, (iii) remove client process item from the Startup folder.

When the operating system starts and Explorer runs the items in the Startup Folder, the client process 102 will start. It may not terminate unless the user closes it from the system tray icon or the operating system shuts down.

The client process 102 may not visible to the user except for a system tray icon containing a few menu items. If, for example, ESPN's BottomLine application is running, the ESPN version of the client process will not display its tray icon because BottomLine will provide the client process 102 some options in its menu. This is useful as it cuts down on the number of icons one could place in the tray on a single client. Programs such as BottomLine and the client process 102 may need to be in periodic communication with each other to ensure one is aware if the other shuts down and that the client process is aware if one of its menu items is selected. The icon will either be an ESPN icon or another icon depending upon the build.

The following items will be in the client process tray icon menu: (i) Help—displays help for the client process 102, (ii) the XML group file can have an optional helpUrl item. When the user selects Help, a browser will be opened with this URL, (iii) About—shows program copyright/information dialog, (iv) Exit—stops the program (does not remove it from startup folder), (v) Uninstall uninstalls the program and removes COM registry entries.

At least one instance of the client process 102 may run at a time. The only exception to this is if clientprocess.exe is run with the /unregserver or /shutdown parameter, that instance will terminate an already running instance, if it exists. Clientprocess.exe may achieve this single instance functionality by creating a shared mutex that is checked by subsequent instances of the program. Thus in some situations, if an existing instance is found, the second one will terminate immediately.

The threading model for the client process could be the apartment model. This means the client process ActiveX controls are designed such that they expect to only be accessed from a single thread. However, the client process as a whole is multithreaded and will start a thread to perform a single asset download, terminate that thread and start another thread when the next download occurs. Only one download may occur at a time.

During regular operating mode, the client process will run without any parameters. However, the following command line parameters could be supported: (i) /regserver; (ii) /shutdown—Stops another running instance of clientprocess.exe, if present; and (iii) /unregserver.

The client process is configured using XML Group files that are downloaded from the configuration server. The URL of the group file is obtained through the xml PARAM tag within the OBJECT tag for the ClientProcessGroup ActiveX control on a web page. Every time a ClientProcessGroup control is initialized with an xml parameter, the client process checks to see if that group has already been added. If not, it is added to the registry and the file is downloaded and parsed. The registry entries for group files are not removed until the client process is uninstalled.

The Group file is downloaded regularly according to its configurable refresh rate. If the server supports the If-Modified-Since header, the client process may not download the file if it has not been modified since the last download.

The XML in the group file uses the RSS format with some additional client process specific elements. RSS is an open format for syndication that is used for many of Disney's feeds. The idea is to try to use as much of the standard as possible so that the group files could potentially be used by other systems.

FIG. 3 shows an exemplary DTD for the group file.

Upon startup, the client process registers itself with the system as a COM Local Server for the following ActiveX controls. Only ClientProcessGroup is marked safe for initialization and only ClientProcessLocator is marked safe for scripting. This is to avoid use of the controls for malicious purposes. The initial prototype of ClientProcess was designed to have an ActiveX interface for each major component to allow a web page to display status. These interfaces are also very useful for troubleshooting during the development/testing phases.

ClientProcessSvc:

This is the main class of the application and is placed on the installation web page with an OBJECT tag to force the download and install of the application. There is a singleton instance of CClientProcessSvc created for the process which tracks all asset and group objects created. The IClientProcessSvc interface provides methods for reporting the status of the program.

ClientProcessGroup:

The ClientProcessGroup ActiveX control is used by JavaScript to assign a configuration file to the client process. Through the IPropertyBag interface, ClientProcessGroup accepts an OBJECT tag parameter, called either xml or source, which is set to the URL of the XML file. A single XML configuration (or group) file is represented by one ClientProcessGroup object. The IClientProcessGroup interface provides status functionality.

ClientProcessLocator:

ClientProcessLocator is a simple control that is safe for scripting and has only one method, GetLocalPath. It is used by JavaScript in the web page that displays the media files to determine the path of the local file, if it has been downloaded.

Furthermore if the user has stopped the client process and then navigates to a media page, the OBJECT tag containing the ClientProcessLocator class id will cause clientprocess.exe to execute again. If the user uninstalled the product, this tag will force a reinstall or an update if the CODEBASE parameter is specified.

ClientProcessAsset:

ClientProcessAsset represents any object that is to be cached locally (group or media file). This COM Object is returned by the get_asset method in ClientProcessSvc or get_queuedAsset in ClientProcessDownloader.

ClientProcessDownloader:

A singleton ClientProcessDownloader is created when the application starts. It handles the download queue of assets. Assets add themselves to the queue with the QueueDownload method and when an asset comes to the top of the download queue, it is handed off to the CAsyncCacheDownloader instance for processing.

ClientProcessReference

ClientProcessReference objects represent media files. Each group can have one or more references. This COM object is returned by the get_reference method in ClientProcessGroup.

Other C++ Classes

This section defines exemplary C++ classes in the client process application and summarizes their behavior and interactions with each other. Some of the classes have COM wrapper objects for communication with other applications. FIG. 4 provides a table of the various classes.

CAsyncCacheDownloader—asynccachedownloader.h/.cpp:

This class encapsulates the downloading of assets to the local device via HTTP. CAsyncCacheDownloader subclasses CWindowImpl to allow it to receive messages since most of its operations occur on a separate thread. The client process uses window messages for inter-thread communication.

Most of its methods run on the main thread, but StartDownload( ) creates a new thread which, in turn, calls the DoDownload( ) method. DoDownload( ) uses WinInet APIs to download a single asset and create an Internet Explorer cache entry for it.

The DoDownload method will download the file in small chunks at a time. It will also sleep after each chunk if the configured throughput is below 100%. For example, if throughput is 50%, the download thread will sleep for the same amount of time it took to download the chunk to achieve an average of 50% throughput.

CCacheAsset—cacheasset.h/.cpp:

A CCacheAsset instance represents a single file that needs to be cached on the local system. This could either be a group file or a media file (reference). Both CCacheGroup and CCacheReference instances instantiate a CCacheAsset instance to handle the downloading and caching of the file. The GetInterface method returns the ClientProcessAsset interface pointer of its respective COM wrapper object.

If a download is unsuccessful, CCacheAsset will set a timer to try again according to the table of FIG. 5. If the download is successful, CCacheAsset watches the file system to make sure the cache item is not deleted from the cache. If it is, the item is downloaded again.

CCacheGroup—cachegroup.h/.cpp:

This class encapsulates the XML group file. Each Group XML file is passed to an instance of CCacheGroup that parses it and creates CCacheReference instances for each media file item. The GetInterface method returns the ClientProcessGroup interface pointer of its respective COM wrapper object. A CCacheAsset instance is created to represent this group file and a timer is set with the interval set to the refreshRate specified in the XML. When the timer goes off, the CCacheAsset for the group file is added to the download queue.

CCacheReference—cachereference.h/.cp:

As the XML group file is parsed by CCacheGroup, a CCacheReference instance is created for each media file item. CCacheReference creates a CCacheAsset instance to handle the download/cache functionality. This class is also responsible for checking item expiration times and removing items from disk that have expired.

CCacheTime—cachetime.h/.cpp:

CCacheTime subclasses the ATL CTime class to provide time conversion functionality. All date/time member variables in the client process are stored using CCacheTime.

CClientProcessModule—clientprocess.cpp:

This class represents the executable process itself. CClientProcessModule subclasses the standard ATL CAtlExeModuleT class. The reason for this is to add functionality to the startup of the process as well as the register and unregister. At startup, a shared mutex is created using the ClientProcessSvc GUID as the name (to ensure uniqueness). If the mutex already exists, that means the application is already running, so the current instance exits. All the extra install and uninstall functionality is done in this class as well.

CException—exception.h/.cpp:

Instances of CException are created and thrown when errors occur. CException handles the formatting of an error.

CRegistryVirtualDeviceX—registryvirtualdevicex.h:

Subclass of CRegistryVirtualDevice in ATL. This class overloads AddStandardReplacements to stop ATL from checking the extension of the module to determine whether we should put InProcServer32 or LocalServer32 in the registry. The client process is always an .exe and, therefore, a LocalServer, so the call may be unnecessary and added external requirements on the application.

CTimer and CTimeable—timer.h/.cpp:

CTimer encapsulates timer functionality. Any object that wishes to use a timer need only to inherit from CTimeable, implement OnTimer, create an instance of CTimer and call its Start method. Stop( ) stops the timer.

CUrlMap—urlmap.h/.cpp:

CUrlMap is a specialized CAtlMap template class that allows one to create hash map classes that map objects to URLs.

More specifically, the system is further enhanced by: (i) adding download rate (throttling) support to download code, (ii) deleting assets when they expire, (iii) implementing ClientProcessLocator control and removing cookie logic, (iv) using a system tray icon and menu, (v) providing uninstall (removing executable, removing startup shortcut, cleaning registry), (vi) providing HitCountURL support, (vii) providing program information (an about dialog).

Care has been taken to ensure: (i) all proper ActiveX safety settings are applied to each control, (ii) COM methods and properties are hidden (this way they will not show up in control design user interfaces like Visual Basic), (iii) static function is used to poll the file system so only one timer is used, (iv) logic to BottomLine is added to detect ClientProcess and provide the System Tray icon submenu, (v) startup menu shortcut is used instead of windows run registry entry, (vi) regularly, check the cookie that indicates whether ClientProcess is installed and re-create it if necessary.

C(iii). BottomLine Enhancements

BottomLine (Trademark of ESPN) may need to be modified to detect the client process and, if present, display the client process menu items in its System Tray menu. This precludes having multiple icons in the tray if the user has both applications installed and running.

The client process will define its menu item ids within the range CLIENTPROCESS_MENU_START and CLIENTPROCESS_MENU_END. These constants will be defined in a header file that is accessible to BottomLine when it is built.

BottomLine and the client process need to be aware of whether each process is running so they will need to perform the following steps: (a) when BottomLine starts up, it tries to create the client process Mutex to see if the client process is running, (b) when the client process starts up or closes, it broadcasts a registered windows message that BottomLine sees and BottomLine will respond with an acknowledgement, (c) when BottomLine starts up or closes, it broadcasts a registered windows message that the client process sees and the client process will respond with an acknowledgement.

Registered windows messages may allow applications to define their own unique messages for communication with other windows that also register the same message. When the client process or Bottomline announces its presence to the other application or acknowledges, it will pass along its window handle for future communication. Then the client process will use WM_COPYDATA to send to BottomLine the information to be displayed in the menu. When a client process menu item is select, BottomLine will forward it.

Some of the features also included with the system that implements the client process are: (i) ease of installation and updating (automatic), (ii) little or no client side user interface, (ii) server side configuration of the client program, (iii) control over rate at which files are downloaded, (iv) ability to track how many media files are downloaded, (v) ability to determine status of a media file download via JavaScript, (vi) ability to ship a version of the control that is content provider specific (e.g., ESPN specific) in its naming.

C(iv). System Features

Client Process Program:

The client process program is responsible for downloading media content hours before it is to be displayed on the web page. When the user navigates to a page containing the HTML to display that file, the local copy of the file can be used, which will significantly improve playback quality.

Installation:

The client program may be allowed to install automatically. Any web page could contain a tag referring to the client process and the browser will automatically install it or update it, if necessary.

User Interface:

The user interface for the client program can be integrated into a system tray icon with a menu providing the ability to turn off or uninstall the product. If the BottomLine application is present, its existing system tray menu may be used instead.

Execution:

The client process may be installed in the startup folder on the user's device so it will always be running. The program may regularly download an XML file from a WDIG server that will contain information about which assets to download, when they expire and at what rate to download them. There will also be an interface for content provider web sites to communicate with the client process to determine the location of local media files.

Hosting:

The installation .cab file may be hosted by one or more head-ends provided by the Vertical using this product. Since it is a static file, it can be hosted by any web server. As new versions of the client process are released, this file will be updated on the server.

Content Provider Bottom Line Modifications:

Suitable modifications may be done to the BottomLine application to provide the system tray interface for the client process.

Sample HTML and Script:

Sample HTML and JavaScript may be provided to developers to demonstrate how to host and communicate with the client process.

External Interface Requirements

This section describes the external systems for which interfaces will need to be created or modified.

ESPN BottomLine:

Some minor changes may be made to BottomLine to detect the presence of the client process and add menu items to stop and uninstall the client.

Client Process Detection:

Each time the Bottomline menu is displayed, BottomLine must detect the presence of the client process and, if present and running, display a submenu containing the client process menu items. Detection of the client process is easily done by checking for the existence of a Mutex that the client process creates upon startup or by looking for a window that has the client process window class.

Client Process Communication:

If the client process is running, BottomLine may use windows messages to query which menu items to display. When a client process menu item is selected, BottomLine will use messages to tell the client process as to which item was selected.

Media Content Server:

The server that hosts the media files may be any HTTP 1.1 web server which should support HTTP byte range downloading (206 success code) in order to enable download throttling. If the server does not support byte ranges, the entire file could be downloaded at once, regardless of configuration settings.

Configuration Server Interface:

There could be a server that hosts the XML configuration file. The XML may adhere to a format that is published in the design specifications.

Functional Requirements

1. Setting a cookie on the user's device indicating the program is installed. This cookie could be periodically checked to make sure the user did not remove it.

2. Support software updates via Internet Explorer's Component Download facility will ensure client code is properly updated if a new version is placed on the head end and the HTML page is modified to request a more recent version. Also, it may be ensured that no rebooting is required upon refresh.

3. Program may be installed in the startup folder and, therefore, will always be running unless the user specifically stops it.

4. Only one instance of the program will be running at once.

5. Uninstall will be provided through a system tray icon menu. Uninstall may be from initiated outside the program.

6. Menu items provided by a system tray icon.

7. Help—displays help for Disney Cache.

8. The configuration file can have an optional helpURL item. When the user selects Help, a browser will be opened with this URL.

9. About—shows program copyright/information dialog.

10. Exit stops the program (does not remove it from startup folder).

11. Uninstall uninstalls the program and removes registry entries.

12. The configuration file: (i) may be in XML Format, (ii) may provide refresh rate for determining how often to download the configuration file, (iii) may provide per-item settings for the URL, expiration date, URL for hit tracking and the download rate. Furthermore, the priority of an item may determined by the order in the configuration file. Also, two different configuration files may not contain the same item with the same URL. In addition, information about the location of the XML configuration file could be located in the registry under HKEY_CURRENT_USER.

File Download

Browser (e.g., Internet Explorer) Cache:

The client process could use the Internet Explorer cache to provide client side caching of the media files. Files stored in the cache could be cleaned up by Internet Explorer, if necessary, to make room for other items. The XML configuration file, however, may be marked as sticky so it will remain on the hard drive for a certain period of time (e.g., 30 days). Since the Internet Explorer cache is on a per Windows login basis, each user is allowed to have a separate cache.

The client process will need to check periodically (or use a File System watch) to detect when an item has been removed from the cache. If it has not yet expired, it will be downloaded again.

Item Lifespan:

Each item will have an expiration date and time. Periodically, the client process will check these times and delete any item from the cache that has expired. The client process needs to be sure to track assets that exist on the device so that if they are removed from the XML configuration file before the client had a chance to expire them, they wilt still get deleted from the user's hard drive (this could happen if the user has had their device off for an extended period of time).

Once an item is downloaded, it will not be downloaded again unless Internet Explorer has removed it from the cache.

Configuration Refresh:

The client process will periodically refresh the XML configuration file by downloading it from the server at the rate specified by the refreshRate XML element.

Download Errors:

If an error occurs when an item is being downloaded, after a timeout, the client process will try again. The amount of time to wait is dependent upon the type of error according to the chart provided in FIG. 6.

Furthermore, the client process may perform downloads if network connectivity is available. If required, it may not perform a dialup to do downloads.

Throttling:

Each item in the configuration file can optionally be configured to have a specific download throughput percentage. This implies that the client process may download the file in pieces and pause between each piece to achieve this. The web server that hosts the file should be capable of supporting the HTTP byte range feature.

Web Interface

URL for configuration file may be passed to the client process via an ActiveX control property. ActiveX control will be safe for scripting and safe for initialization. The client process could check the server part of the XML configuration URL to verify it is from the go.com domain. This is to prevent malicious web pages from initializing the client process with potentially harmful data (large files downloaded often with small refresh rates). The OBJECT tag need not have a CODE-BASE parameter so that the client process is not accidentally installed for someone who has not opted in. The JavaScript may have code to check whether the object exists before making any API calls and also check the installed cookie. At least one version of the client process can be installed on the client device.

D. General

The description of exemplary and anticipated embodiments of the invention has been presented for the purposes of illustration and description. They are not intended to be exhaustive or to limit the invention to the precise forms disclosed.

Many modifications and variations are possible in light of the teachings herein. For example:

(a) It may be possible to create a new component that provides generic System Tray icon support where installed client apps can register themselves to add menu items.

(b) The server-side user settings to determine the behavior of the client process. The client process would need a unique identifier that is tied to the user who installed it. Then the server could be more sophisticated and send different XML configuration files for different users.

(c) Continuation of downloads that do not complete.

(d) Adding more sophisticated download throttling (for example, taking the baseline client bandwidth measurement and using that for calculating throughput control).

(e) Server-side smarts for determining server load based upon MRTG data and use that to decide to return 503 responses to the client process to prevent heavy load on asset download.

It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and methods herein disclosed and limited solely by the spirit and scope of the appended claims.

We claim:

1. A method for use by a content provider for delivering a media asset to a user device over a network, the method comprising:

supplying a media asset list over the network to the user device;

updating the media asset list on the user device automatically based on user viewing preferences;

receiving a selected media asset from the media asset list from the user device;

delivering to the user device the selected media asset from the media asset list over the network for display by the user device;

sending a message to the user device over the network using a callback uniform resource locator (URL) upon completing the delivery of the selected media asset;

limiting a number of viewings of the selected media asset from the media asset list for the user device; and providing a key to the user device, wherein the key is for decrypting the selected media asset after completing the delivery of the selected media asset and while the user device is not connected to the network.

2. The method of claim 1 further comprising:

limiting a period of time during which the selected media asset from the media asset list can be viewed using the user device.

3. The method of claim 2, wherein the period of time is twenty four hours.

4. A content provider for delivering a media asset to a user device over a network, the content provider comprising:

a memory; and a CPU configured to:

supply a media asset list over the network to the user device;

update the media asset list on the user device automatically based on user viewing preferences;

receive a selected media asset from the media asset list from the user device;

deliver to the user device the selected media asset from the media asset list over the network for display by the user device;

send a message to the user device over the network using a callback uniform resource locator (URL) upon completing the delivery of the selected media asset;

limit a number of viewings of the selected media asset from the media asset list for the user device; and provide a key to the user device, wherein the key is for decrypting the selected media asset after completing the delivery of the selected media asset and while the user device is not connected to the network.

5. The content provider of claim 4, wherein the CPU is further configured to:

limit a period of time during which the selected media asset from the media asset list can be viewed using the user device.

6. The content provider of claim 5, wherein the period of time is twenty four hours.

* * * * *